United States Patent
Weale

(10) Patent No.: US 10,164,483 B2
(45) Date of Patent: Dec. 25, 2018

(54) TUNABLE RESONANT INDUCTIVE COIL SYSTEMS FOR WIRELESS POWER TRANSFER AND NEAR FIELD COMMUNICATIONS

(71) Applicant: SEMICONDUCTOR COMPONENTS INDUSTRIES, LLC, Phoenix, AZ (US)

(72) Inventor: Gareth Pryce Weale, New Hamburg (CA)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 168 days.

(21) Appl. No.: 15/073,106

(22) Filed: Mar. 17, 2016

(65) Prior Publication Data

US 2016/0276877 A1 Sep. 22, 2016

Related U.S. Application Data

(60) Provisional application No. 62/134,445, filed on Mar. 17, 2015.

(51) Int. Cl.
*H02J 50/80* (2016.01)
*H02J 50/12* (2016.01)
*H04B 5/00* (2006.01)

(52) U.S. Cl.
CPC .............. *H02J 50/80* (2016.02); *H02J 50/12* (2016.02); *H04B 5/0031* (2013.01); *H04B 5/0037* (2013.01); *H04B 5/0081* (2013.01)

(58) Field of Classification Search
CPC ............ H02J 5/005; H02J 7/025; H02J 17/00; H02N 2/008; H04B 5/0025–5/0093;
(Continued)

(56) References Cited

U.S. PATENT DOCUMENTS 7,015,769 B2  3/2006 Schulman et al.
7,167,090 B1  1/2007 Mandal et al.
(Continued)

OTHER PUBLICATIONS

Ali Tombak, Tunable Barium Strontium Titanate Thin Film Capacitors for RF and Microwave Applications, IEEE Microwave and Wireless Components Letters, vol. 12, pp. 3-5.*
(Continued)

*Primary Examiner* — Rexford Barnie
*Assistant Examiner* — Thai Tran
(74) *Attorney, Agent, or Firm* — IPTechLaw

(57) ABSTRACT

A tunable resonant inductive coil system includes an electrical circuit having an alternating current (AC) voltage source, a barium strontium titanate (BST) variable capacitor coupled in series with a first terminal of the AC voltage source, a coil coupled in series with the BST variable capacitor, and a return line coupling the coil with a second terminal of the AC voltage source and/or a ground. The electrical circuit forms an LC circuit (resonant circuit). The electrical circuit adjusts between two configurations. In the first configuration the resonant circuit has a first resonant frequency configured for wireless power transfer and in the second configuration it has a second resonant frequency configured for near field communication (NFC). An entire length of the coil is used for both resonant frequencies. Adjusting between the first and second configurations includes varying a capacitance of the BST variable capacitor in response to receiving a control signal.

16 Claims, 9 Drawing Sheets

(58) Field of Classification Search
CPC .................... B60L 5/005; B60L 11/182; B60L 11/1829–11/1831; Y02T 90/122; H01F 38/14; H01F 2038/143–2038/146; H01R 13/6633; A61B 1/00029; A61N 1/3787
USPC .......................................... 307/104; 320/108
See application file for complete search history.

(56) References Cited

U.S. PATENT DOCUMENTS

| | | | |
|---|---|---|---|
| 7,515,012 | B2 | 4/2009 | Schulman et al. |
| 8,111,042 | B2 | 2/2012 | Bennett |
| 8,264,154 | B2 | 9/2012 | Banner et al. |
| 8,374,545 | B2 | 2/2013 | Menegoli et al. |
| 8,599,726 | B2 | 12/2013 | Mikhemar et al. |
| 8,682,261 | B2 | 3/2014 | Ozaki et al. |
| 8,725,085 | B2 | 5/2014 | Darabi et al. |
| 8,803,474 | B2 | 8/2014 | Hillan et al. |
| 8,805,433 | B2 | 8/2014 | Al-Shalash |
| 8,832,468 | B2 | 9/2014 | Pop |
| 8,868,014 | B2 | 10/2014 | Krivokapic |
| 8,933,583 | B2 | 1/2015 | Uchida |
| 2012/0056486 | A1* | 3/2012 | Endo ................... H02J 5/005 307/104 |
| 2012/0153737 | A1* | 6/2012 | Karalis ................. B60L 3/0069 307/104 |
| 2013/0119924 | A1* | 5/2013 | Kasturi ................. H04B 5/0087 320/108 |
| 2013/0123881 | A1* | 5/2013 | Aghassian ........... A61N 1/3787 607/61 |
| 2013/0214734 | A1* | 8/2013 | Kang .................... H02J 7/0013 320/108 |
| 2014/0035521 | A1* | 2/2014 | Endo ........................ H02J 7/025 320/108 |
| 2014/0141715 | A1* | 5/2014 | Smith .................. H04B 5/0075 455/41.1 |

OTHER PUBLICATIONS

Michael Gebhart, Thomas Baier, Marc Facchini, "Automated Antenna Impedance Adjustment for Near Field Communication (NFC)", "2013 12th International Conference on Telecommunications (ConTEL)", Jun. 26, 2013, pp. 235-242, Publisher: Institute of Electrical and Electronics Engineers (IEEE).

Huy Hoang, Franklin Bien, "Maximizing Efficiency of Electromagnetic Resonance Wireless Power Transmission Systems with Adaptive Circuits", "Wireless Power Transfer—Principles and Engineering Explorations, Ch. 11, ed. by Ki Young Kim", Jan. 25, 2012, pp. 207-227, Publisher: InTech.

W.S. Lee, H.L. Lee, K.S. Oh, J.W. Yu, "Switchable Distance-based Impedance Matching Networks for a Tunable HF System", "Progress in Electromagnetics Research", May 14, 2012, pp. 19-34, vol. 128.

* cited by examiner

TUNABLE RESONANT INDUCTIVE COIL SYSTEMS FOR WIRELESS POWER TRANSFER AND NEAR FIELD COMMUNICATIONS

CROSS REFERENCE TO RELATED APPLICATIONS

This document claims the benefit of the filing date of U.S. Provisional Pat. App. 62/134,445 titled "Tuning Inductive Coils for Wireless Charging" to Gareth Pryce Weale, filed Mar. 17, 2015, the disclosure of which is incorporated entirely herein by reference.

BACKGROUND

1. Technical Field

Aspects of this document relate generally to systems and methods for wireless power transfer, such as wireless battery charging. Aspects of this document relate generally to systems and methods for near field communication (NFC).

2. Background

Wireless power transfer uses coupled coils to transfer power from one coil to another. Wireless power transfer using inductive coupling may include changing a current through a first coil to induce a voltage across a second coil. Wireless power transfer using resonant inductive coupling may include the use of a first coil included in a first resonant circuit and a second coil included in a second resonant circuit, the two resonant circuits tuned to resonate at the same frequency. Near field communication (NFC) is a communication protocol enabling electronic devices to transfer data when brought within close proximity.

SUMMARY

Implementations of tunable resonant inductive coil systems may include: an electrical circuit including an alternating current (AC) voltage source, a barium strontium titanate (BST) variable capacitor coupled in series with a first terminal of the AC voltage source, a coil coupled in series with the BST variable capacitor, and a return line coupling the coil with one of a second terminal of the AC voltage source and a ground; wherein the electrical circuit forms an LC circuit (resonant circuit); wherein the electrical circuit is configured to, in response to receiving one or more electrical signals, adjust between a first configuration and a second configuration, wherein in the first configuration the resonant circuit has a first resonant frequency configured to be used for wireless power transfer and in the second configuration the resonant circuit has a second resonant frequency configured to be used for near field communication (NFC), wherein an entire length of the coil is used for both the first resonant frequency and the second resonant frequency, and; wherein adjusting the electrical circuit between the first configuration and the second configuration includes varying a capacitance of the BST variable capacitor in response to receiving a control signal at the BST variable capacitor.

Implementations of tunable resonant inductive coil systems may include one, all, or any of the following:

The coil may include an antenna.

Adjusting the electrical circuit between the first configuration and the second configuration may include one of opening and closing a switch of the electrical circuit to one of electrically couple a fixed capacitor with the resonant circuit and electrically isolate the fixed capacitor from the resonant circuit.

The system may include a second BST variable capacitor coupled in series with the coil on the return line.

The system may further include a fixed capacitor coupled in parallel with the second BST variable capacitor and coupled in series between the coil and one of the second terminal of the AC voltage source and the ground.

The system may further include a fixed capacitor coupled in series between the first terminal of the AC voltage source and the coil.

The system may further include a fixed capacitor coupled in series between the coil and one of the second terminal of the AC voltage source and the ground.

The system may further include a fixed capacitor coupled in parallel with the BST variable capacitor and in series between the first terminal of the AC voltage source and the coil.

The first resonant frequency may be between 5.800 MHz and 7.525 MHz and the second resonant frequency may be between 9.625 MHz and 14.850 MHz.

Implementations of tunable resonant inductive coil systems may include: an electrical circuit consisting of an alternating current (AC) voltage source; one or more barium strontium titanate (BST) variable capacitors, at least one of the one or more BST variable capacitors coupled in series with a first terminal of the AC voltage source; a coil coupled in series with the first terminal of the AC voltage source; a return line coupling the coil with one of a second terminal of the AC voltage source and a ground; a switch coupled with the AC voltage source; a direct current (DC) voltage source controlling the switch, and; one or more additional passive electrical components; wherein the electrical circuit forms an LC circuit (resonant circuit); wherein the electrical circuit is configured to, in response to receiving one or more electrical signals, adjust between a first configuration and a second configuration by one of opening and closing the switch and by correspondingly varying a capacitance of the one or more BST variable capacitors, wherein in the first configuration the resonant circuit has a first resonant frequency configured to be used for wireless power transfer and in the second configuration the resonant circuit has a second resonant frequency configured to be used for near field communication (NFC), and; wherein an entire length of the coil is used for both the first resonant frequency and the second resonant frequency.

Implementations of methods of use of tunable resonant inductive coil systems may include: providing an electrical circuit, the electrical circuit including an alternating current (AC) voltage source having a first terminal, a variable capacitor electrically coupled in series with the first terminal of the AC voltage source, a coil electrically coupled in series with the variable capacitor, and a return line electrically coupling the coil with one of a second terminal of the AC voltage source and a ground, the electrical circuit including an LC circuit (resonant circuit); in response to the electrical circuit receiving a control signal at the variable capacitor, adjusting a capacitance of the variable capacitor to adjust a resonant frequency of the resonant circuit between a first resonant frequency configured to be used for wireless power transfer and a second resonant frequency configured to be used for near field communication (NFC), and; using an entire length of the coil for both the first resonant frequency and the second resonant frequency.

Implementations of methods of use of tunable resonant inductive coil systems may include one, all, or any of the following:

Adjusting the resonant frequency between the first resonant frequency and the second resonant frequency may include adjusting the resonant frequency from a lower value to a higher value and/or adjusting the resonant frequency from the higher value to the lower value, wherein the lower value is between 5.800 MHz and 7.525 MHz and wherein the higher value is between 9.625 MHz and 14.850 MHz.

The variable capacitor may include a barium strontium titanate (BST) variable capacitor.

The coil may include an antenna.

The variable capacitor may not be a switched capacitor, a varactor diode, or a trimmer capacitor.

Adjusting the resonant frequency between the first resonant frequency and the second resonant frequency may include either opening or closing a switch of the electrical circuit.

Either opening or closing the switch may electrically couple a fixed capacitor in parallel with the coil.

The method may further include tuning the capacitance of the variable capacitor to adjust the first resonant frequency and/or the second resonant frequency in response to the resonant circuit being out of resonance with a second resonant circuit of a computing device.

Tuning the capacitance of the variable capacitor may include adjusting the first resonant frequency from a first value to a second value and/or adjusting the second resonant frequency from a third value to a fourth value, wherein the first value and the second value are between 5.800 MHz and 7.525 MHz and wherein the third value and the fourth value are between 9.625 MHz and 14.850 MHz.

The electrical circuit may include a near field communication (NFC) chip coupled with the resonant circuit and adjusting the resonant frequency to the second resonant frequency may protect the NFC chip from wireless power transfer signals from a power source by detuning the resonant circuit from the wireless power transfer signals.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended tunable resonant inductive coil systems for wireless power transfer and near field communications and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such tunable resonant inductive coil systems for wireless power transfer and near field communications and related methods, and implementing components and methods, consistent with the intended operation and methods.

Figure 2:
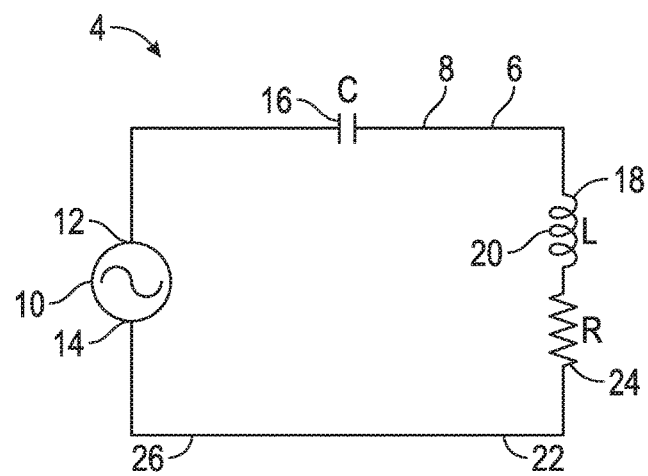
FIG. 2 is a diagram of a resonant inductive coil system.

Referring to FIG. 2, a conventional resonant inductive coil system (system) 4 is shown. The system includes an electrical circuit 6 which includes an LC circuit (resonant circuit) 8. An alternating current (AC) voltage source 10 has a first terminal 12 and a second terminal 14. A fixed capacitor 16 is coupled in series with the AC voltage source through the first terminal. An inductor 18 which includes a coil 20 is coupled in series with the fixed capacitor. A resistor 24 is coupled in series with the coil. A number of lines 26 couple the various elements together. In the implementation shown the lines may be conductive lines on a semiconductor device, such as metallization, routing, and the like. A return line 22 electrically couples the resistor with the second terminal of the AC voltage source.

A conventional series LCR resonant circuit such as that shown in FIG. 2 has a resonant frequency which is dependent, at least in part, on the capacitance of the fixed capacitor and the inductance of the inductor. The reactance of the capacitor at any given frequency is:

$$X_C = \frac{1}{2\pi f C}$$

where f is the frequency of the resonant circuit and C is the capacitance of the fixed capacitor. The reactance of the inductor at any given frequency is:

$$X_L = 2\pi f L$$

where f is the frequency of the resonant circuit and L is the inductance of the coil/inductor. The resonant circuit is resonant when the reactances of the inductor and capacitor are equal, at:

$$X_L = X_C$$

which gives the resonant frequency as:

$$f = \frac{1}{2\pi \sqrt{LC}}$$

The total reactance of the LCR resonant circuit may be given as:

$$X = X_L - X_C + R$$

where R is the resistance of the resistor. Each of the reactances, including the total reactance, is measured in ohms.

Though not shown in the drawings, the various reactances and the resistance of the resistor may be plotted on the same graph where reactance and resistance are plotted on the y coordinate and frequency is plotted on the x coordinate. On such a graph the reactance of the capacitor $X_C$, reactance of the inductor $X_L$, and resistance of the resistor when plotted together reveal that $X_C$ is plotted as a curve that decreases as f increases, $X_L$ is a straight line which increases as f increases, and the resistance of the resistor is a constant. Because $X_C$ decreases with increasing frequency and $X_L$ increases with increasing frequency, and because at the resonant frequency $X_L = X_C$, at frequencies below the resonant frequency the LCR circuit behaves like a capacitor, at the resonant frequency it behaves like a resistor, and at frequencies above the resonant frequency it behaves like an inductor.

Figure 1:
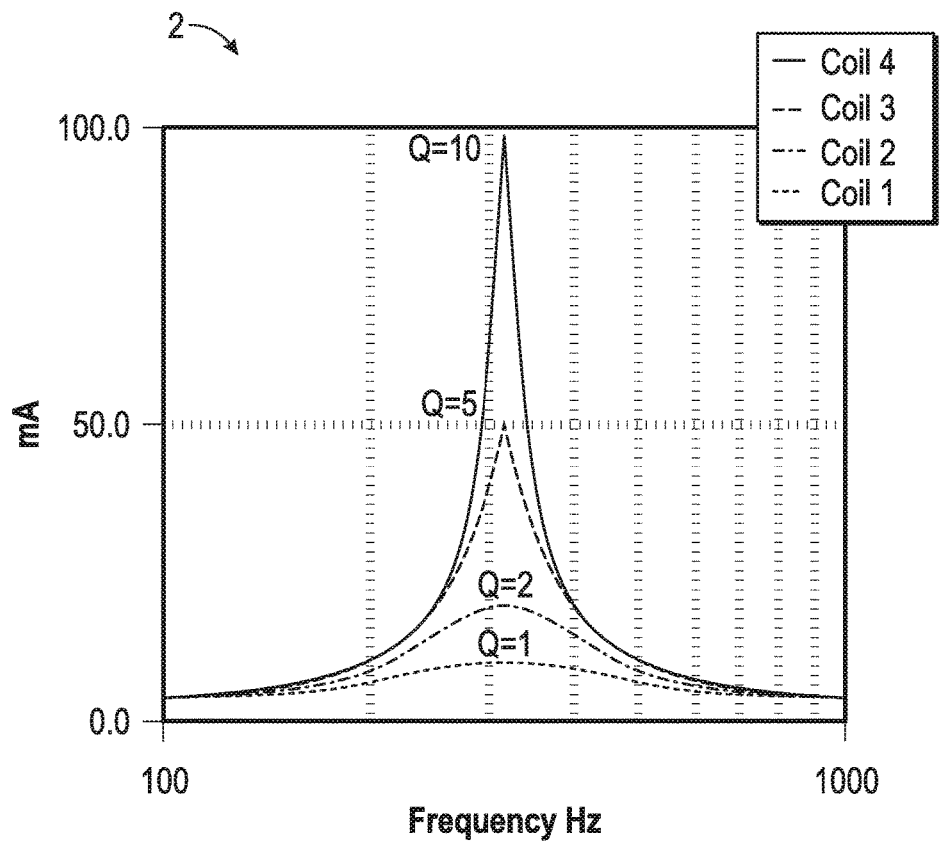
FIG. 1 is a graph plotting current versus frequency for a plurality of coils.

For a conventional series tuned circuit, such as that described above, the current of the resonant circuit may be plotted versus frequency as shown in graph 2 of FIG. 1. Graph 2 plots current in milliamps versus frequency in Hz on a logarithmic scale based on a Q value of the coil. The Q value is a coil quality factor, and current versus frequency is plotted for four different coils, having different Q values. It is seen that the Q value affects the current, such that coils with higher Q values have higher peak currents. Coil 1 is shown having a Q value of 1 and a peak current of about 10.0 mA, coil 2 is seen having a Q value of 2 and a peak current of about 20.0 mA, coil 3 is seen having a Q value of 5 and a peak current of about 50.0 mA, and coil 4 is seen having a Q value of 10 and a peak current of about 100.0 mA.

The Q value of the coil/system is inversely proportional to the bandwidth of the coil based on the relationship $BW = F_C / Q$, where BW is the bandwidth and $F_C$ is the resonant frequency of the system. Accordingly, as Q increases, the bandwidth decreases, so that a high Q resonant circuit has a narrow bandwidth relative to a low Q resonant circuit. This increases the difficulty of tuning higher Q systems to have the bandwidth centered at the driving frequency.

In both wireless power transfer (WPT) systems and near field communication (NFC) systems there generally exists a transfer coil/system ($T_X$) and a receiving coil/system ($R_X$). The $T_X$ coil generates a magnetic field based in part on the peak current, and it is desirable to have a higher peak current and to align the peak current with the resonant frequency of the system for the most effective/efficient transfer of power and/or data. Accordingly, in an ideal system the bandwidth will be centered about the driving frequency of the transferring system $T_X$.

The resonant frequency of a system, however, may be affected by a variety of factors. Temperature and proximity to other magnetic objects, for example, may alter the resonant frequency of a system. As may be envisioned, if the resonant frequency changes even slightly, especially for higher Q systems, the current in the system can dramatically fall. As described above, both WPT and NFC systems work by transmitting magnetic waves on a specific frequency from a transmitter to a receiver. The magnetic waves interact with a coil in the receiver to induce an electric current. If the receiving coil is tuned so that its resonant frequency matches the frequency of the magnetic waves, the current is amplified. If the receiver and transmitter are out of tune, however, the transfer is inefficient. The receiver coil may still pick up a trace amount of current, but it will not be as amplified as desired.

The tuning of transferring and receiving coils/systems for wireless power transfer (WPT) is generally described in U.S. patent application Ser. No. 14/843,819, filed Sep. 2, 2015, titled "Tunable/De-Tunable Wireless Power Resonator System and Related Methods," listing as first inventor Abdullah Ahmed (referred to hereinafter as the '819 application), now pending, the disclosure of which is entirely incorporated herein by reference. Low frequency systems for wireless power transfer (WPT) using resonance may require coil antennas because the primary energy transport is in the B field rather than the E field.

Thus in any coil based charging or communication system the magnetic field generated is a function of the coil design and the peak current delivered into the coil by the driver. The coil is configured as a series resonant load so that there is low resistance at peak resonance. The magnetic field strength of the transferring coil limits the transfer from the transferring coil to the receiving coil through Faraday's law which states that the rate of change of flux gives the electromotive force (voltage) resulting in the receiving coil. In addition to the Q value/factor, efficiency of the transfer between the primary (transferring) and secondary (receiving) coils is also affected by the diameter of each coil, the difference between the coil diameters (relative diameter), and the distance between the coils.

Accordingly, tuning of resonant circuits used for WPT or NFC allows the systems to maintain high current in the coil (high Q) at the correct frequency (BW center) to maintain efficient transfer. As described above, some such tuning methods and mechanisms are described in the '819 application. Because heat, nearby magnetic devices, and the like, can affect resonance, tuning allows two coils (transferring and receiving coils) to be brought back into resonance to ensure efficient transfer.

Some variable capacitors have been used for tuning conventional resonant inductive coil systems. In some cases, a switched capacitor or multiple switched capacitors such as a capacitor bank, used to alter system capacitance by coupling and decoupling different fixed capacitors to and from the system using a plurality of switches, as desired, have been used to achieve a variable capacitance of the overall system. Such systems by their nature involve "stepped" and not continuous capacitance changes. Changing the capacitance of the system, as will be understood from the above equations, will change the resonant frequency. Some switched-capacitor systems use microelectromechanical (MEM) based switches. Varactor diodes (varicap diodes) have also been used to achieve variable capacitance for tuning of conventional resonant inductive coil systems, which does allow for continuous instead of stepped tuning. Fixed trimmer capacitors have been used for tuning conventional resonant inductive coil systems pre-deployment, but naturally once the system is fully packaged the trimmer capacitor(s) is not re-tuned, so that there is no in-situ tuning during operation.

The capacitance of a parallel plate capacitor having two parallel plates both of area A is given by the equation:

$$C = \varepsilon_r \varepsilon_0 \frac{A}{d}$$

where C is the capacitance, A is the area of each parallel plate, d is the distance between the plates, $\varepsilon_0$ is the electric constant (about $8.854 \times 10^{-12}$ F/m), and $\varepsilon_r$ is the dielectric constant of the material between the plates. Variable capacitors in conventional resonant inductive coil systems have varied the area of the plates (such as trimmer capacitors, switching fixed capacitors in and out using switches, and MEMs based structures) or have varied the separation between plates (such as varactors or varicap diodes and air variable capacitors). It has been observed that varactor diodes (which utilize exponential variation) and switched capacitor systems lack stability in systems which utilize feedback to provide tuning of a resonant circuit.

WPT systems exist that include resonant inductive coil systems and are used, for example, to charge computing devices. Different charging standards exist. The type and configuration of interface circuit (resonant inductive coil circuit) used depends on the standard followed. One interface circuit standard is marketed under the name REZENCE by Alliance for Wireless Power (A4WP) of Altamonte Springs, Fla., and uses a frequency of 6.78 MHz. Another interface standard is marketed under the name QI by Wireless Power Consortium of Piscataway, N.J. (though some products marketed under the name QI use magnetic coupling or electromagnetic induction alone without resonant inductive charging). Resonant charging using resonant inductive coil systems have been found to have an increased charging range over conventional inductive charging, as will be discussed to some extent hereafter. Conventional electromagnetic induction charging systems that do not use resonant inductive charging also require coil alignment to a greater degree than is needed for resonant inductive coil system charging.

Figure 3:
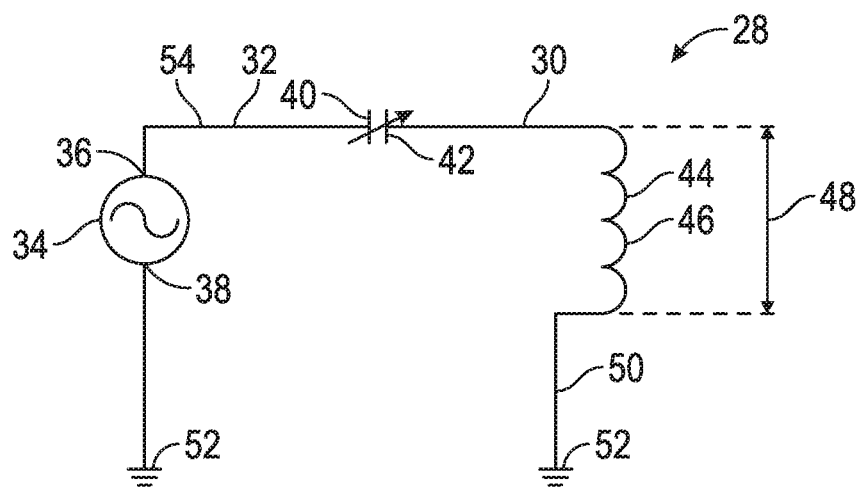
FIG. 3 is a diagram of an implementation of a tunable resonant inductive coil system.

Referring now to FIG. 3, in implementations a tunable resonant inductive coil system (system) 28 includes an electrical circuit 30 which forms an LC circuit (resonant circuit) 32. An alternating current (AC) voltage source 34 has a first terminal 36 and a second terminal 38. A variable capacitor 40 is coupled in series with the first terminal of the AC voltage source. While various types of variable capacitors could be used, such as those described above, in the implementation of FIG. 3 the variable capacitor is a barium strontium titanate (BST) variable capacitor 42. The FIG. 3 implementation is a single ended configuration.

As described above, the capacitance of a variable capacitor may be varied by varying the capacitative area and/or the separation between capacitative plates. With a BST variable capacitor the capacitance may be varied by varying the $\varepsilon_r$ value or, in other words, by varying the dielectric constant of the material between the capacitative plates.

Referring still to FIG. 3, an inductor 44 is coupled in series with the variable capacitor. The inductor shown is a coil 46. A number of lines 54, such as metallization and routing, are used to couple the various elements of the electrical circuit together. A return line 50 couples the coil with a ground 52, and the second terminal of the AC voltage source is also coupled with ground. An entire length 48 of the coil is depicted in FIG. 3.

Figure 4:
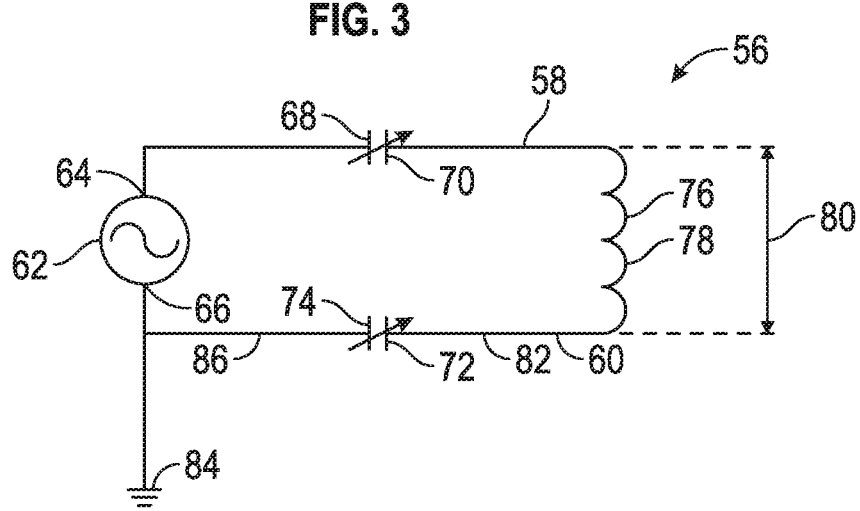
FIG. 4 is a diagram of an implementation of a tunable resonant inductive coil system.

FIG. 4 shows a tunable resonant inductive coil system (system) 56 that is in some ways similar to system 28 but which adds an additional variable capacitor in series with the inductor between the inductor and a ground on the return line. System 56 includes an electrical circuit 58 which forms an LC circuit (resonant circuit) 60. An alternating current (AC) voltage source 62 includes a first terminal 64 and a second terminal 66. A first variable capacitor 68 is coupled in series with the first terminal of the AC voltage source. The first variable capacitor may be any type of variable capacitor, as those described above, but in the representative example is a BST variable capacitor 70. The FIG. 4 implementation is a double ended configuration.

An inductor 76, which comprises a coil 78, is coupled in series with the first variable capacitor. An entire length 80 of the coil is depicted in FIG. 4. A second variable capacitor 72 is coupled in series with the coil on a return line 82 between the coil and a ground 84. Although the second variable capacitor may be any of a variety of capacitor types disclosed above, in the implementation shown it is a BST variable capacitor 74. A number of lines 86, which may include metallization and other conductive elements, couple the various elements of the electrical circuit.

Figure 5:
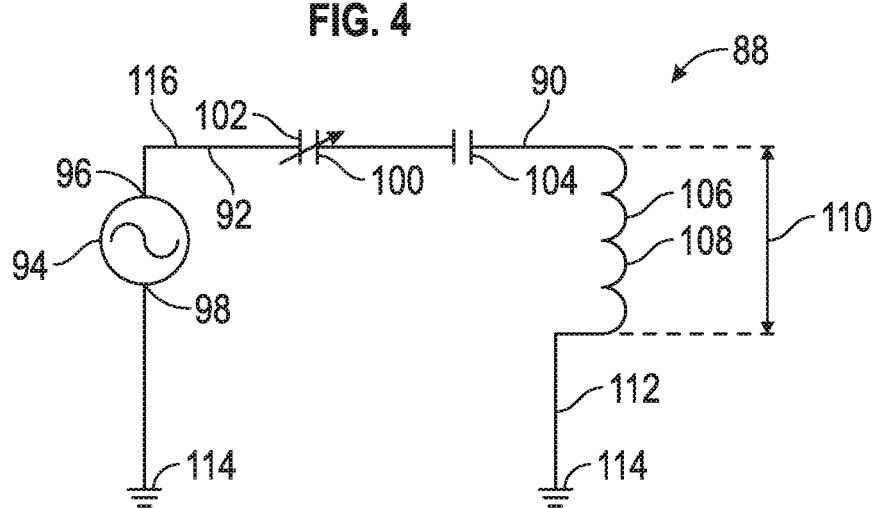
FIG. 5 is a diagram of an implementation of a tunable resonant inductive coil system.

FIG. 5 shows a tunable resonant inductive coil system (system) 88 which is similar to system 28 except that an additional fixed (non-variable) capacitor is placed in series with the variable capacitor between the variable capacitor and the coil. System 88 includes an electrical circuit 90 which forms an LC circuit (resonant circuit) 92. An alternating current (AC) voltage source 94 includes a first terminal 96 and a second terminal 98. A variable capacitor 100 is coupled in series with the first terminal of the AC voltage source. The variable capacitor may include any of a variety of capacitor types, such as those disclosed above, but in the implementation shown is a BST variable capacitor 102. A fixed capacitor 104 is coupled in series with the variable capacitor between the variable capacitor and an inductor 106. The inductor includes a coil 108, and an entire length 110 of the coil is depicted. A return line 112 couples the coil with a ground 114, and a number of lines 116 (including the return line), which may include metallization or other conductive materials, electrically couple the various elements of the electrical circuit. The FIG. 5 implementation is a single ended configuration.

Figure 6:
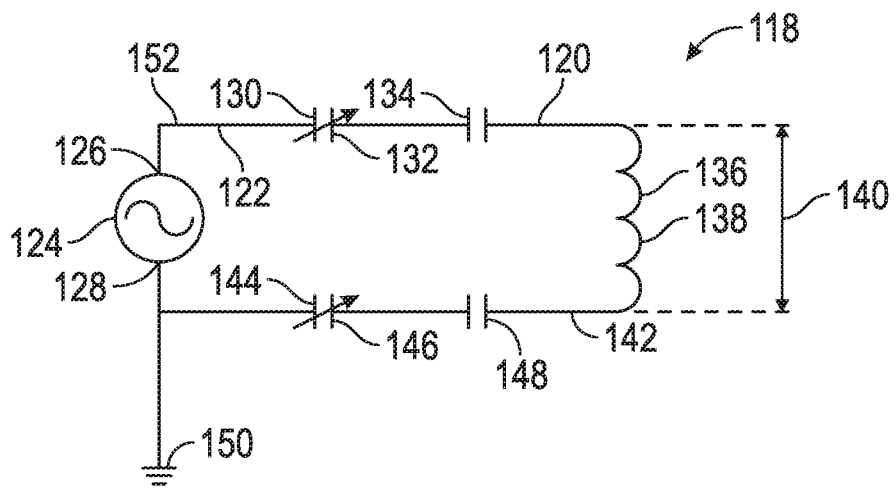
FIG. 6 is a diagram of an implementation of a tunable resonant inductive coil system.

FIG. 6 shows a tunable resonant inductive coil system (system) 118 that is similar to system 56 except including additional fixed capacitors. System 118 includes an electrical circuit 120 that forms an LC circuit (resonant circuit) 122. An AC voltage source 124 has a first terminal 126 and a second terminal 128. A first variable capacitor 130, which in the implementation shown is a BST variable capacitor 132, is coupled in series with the first terminal. A first fixed capacitor 134 is coupled in series with the first variable capacitor. An inductor 136, which includes a coil 138, is coupled in series with the first fixed capacitor. An entire length 140 of the coil is depicted. A second fixed capacitor 148 is coupled in series with the coil on a return line 142, and a second variable capacitor 144, which is a BST variable capacitor 146, is coupled in series with the second fixed capacitor on the return line. The return line couples the second variable capacitor with the second terminal and with a ground 150. A number of lines 152 which may include metallization, routing, and/or the like (and which include the return line), electrically couple the various elements. The FIG. 6 implementation is a double ended configuration.

Figure 7:
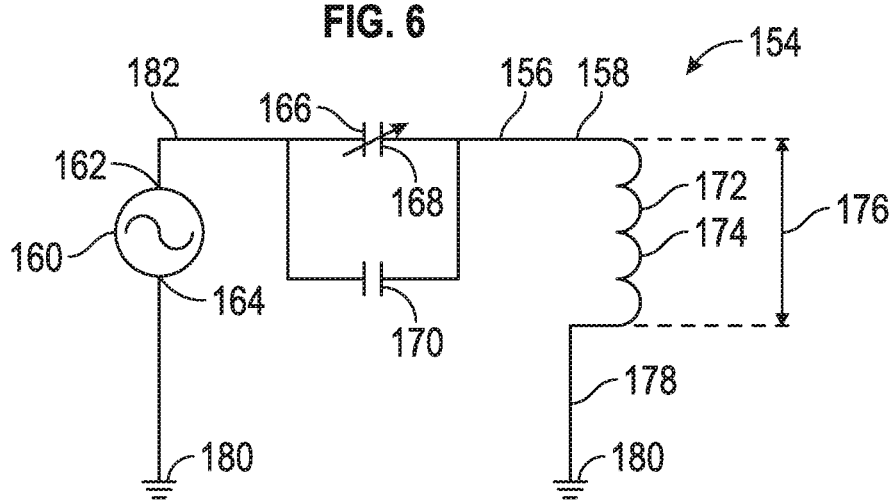
FIG. 7 is a diagram of an implementation of a tunable resonant inductive coil system.

FIG. 7 shows a tunable resonant inductive coil system (system) 154 that is similar to system 28 except that a fixed capacitor is coupled in parallel (shunt) with the variable capacitor. System 154 includes an electrical circuit 156 that forms an LC circuit (resonant circuit) 158. An AC voltage source 160 has a first terminal 162 and a second terminal 164. A variable capacitor 166 is coupled in series with the first terminal of the AC voltage source. The variable capacitor in the implementation shown is a BST variable capacitor 168 though, as with other implementations, could include another type of variable capacitor. A fixed capacitor 170 is coupled in parallel (shunt) with the BST variable capacitor. An inductor 172, which in the implementation shown is a coil 174, is coupled in series with both the BST variable capacitor and the fixed capacitor. An entire length 176 of the coil is depicted. A return line 178 electrically couples the coil with a ground 180, and the second terminal of the AC voltage source is also coupled with the ground. Lines 182, such as metallization, traces, routes, etc. (and including the return line), electrically couple the various elements together. The FIG. 7 implementation is a single ended configuration.

Figure 8:
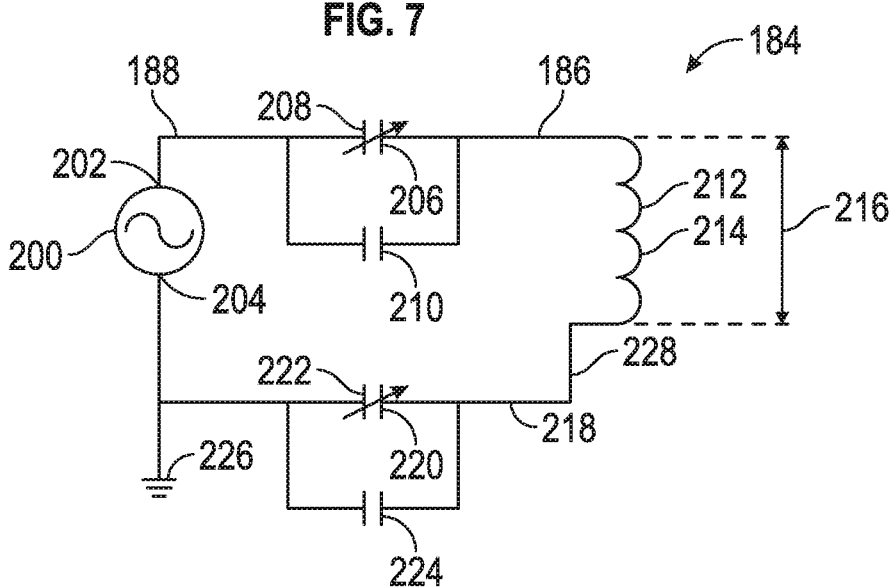
FIG. 8 is a diagram of an implementation of a tunable resonant inductive coil system.

FIG. 8 shows a tunable resonant inductive coil system (system) 184 that is similar to system 56 except that two fixed capacitors are added, one in parallel (shunt) with each variable capacitor. System 184 includes an electrical circuit 186 that forms an LC circuit (resonant circuit) 188. An AC voltage source 200 has a first terminal 202 and a second terminal 204. A first variable capacitor 206, which is a BST variable capacitor 208 in the implementation shown, is coupled in series with the first terminal of the AC voltage source. A first fixed capacitor 210 is coupled in parallel (shunt) with the first variable capacitor. An inductor 212, which in the implementation shown is a coil 214, is coupled in series with both the first variable capacitor and the first fixed capacitor. An entire length 216 of the coil is depicted. The FIG. 8 implementation is a double ended configuration.

On a return line 218, which couples the coil with a ground 226, a second variable capacitor 220, which in the implementation shown is a BST variable capacitor 222, is coupled in series with the coil. A second fixed capacitor 224 is coupled in parallel (shunt) with the second variable capacitor and in series with the coil. A number of lines 228, which may include metallization, traces, routes, etc. (and including the return line), electrically couple the various elements together.

Figure 9:
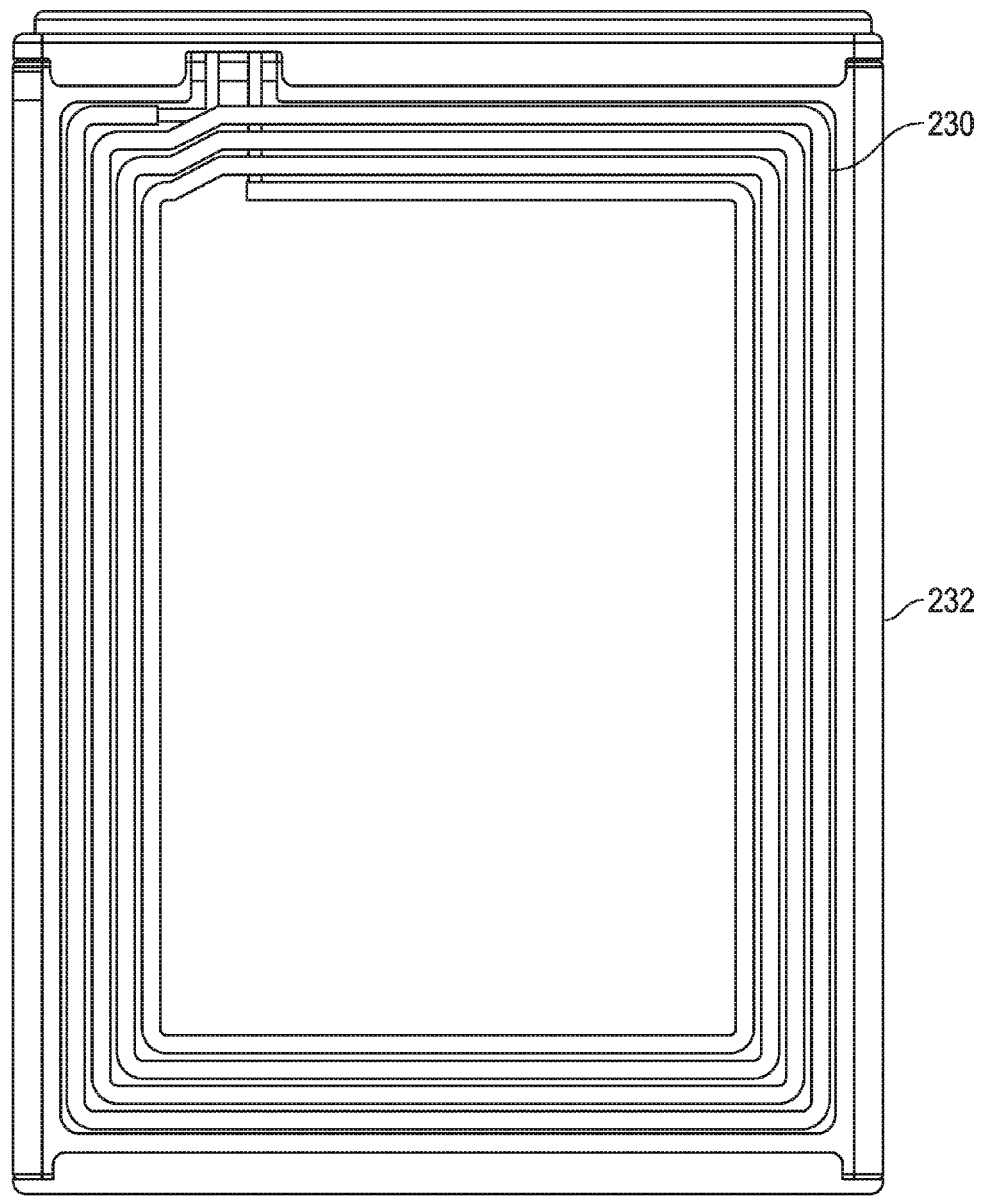
FIG. 9 is a top view of an implementation of a coil used with a tunable resonant inductive coil system.

FIG. 9 shows a representative of a coil implementation. Coil 230 is located on/near a surface of a battery 232 of a mobile computing device, such as a smart phone. The coil 230 could be used as the coil for any of the systems described above. As the coil in all of the implementations may be used to communicate data and/or energy via resonant magnetic coupling, the coil in various implementations may also be an antenna. FIG. 9 illustrates only one representative example of a coil, and in other implementations the coil could be implemented on a motherboard or printed circuit board (PCB), within one or more semiconductor devices or packages of a computing device, and so forth.

Figure 10:
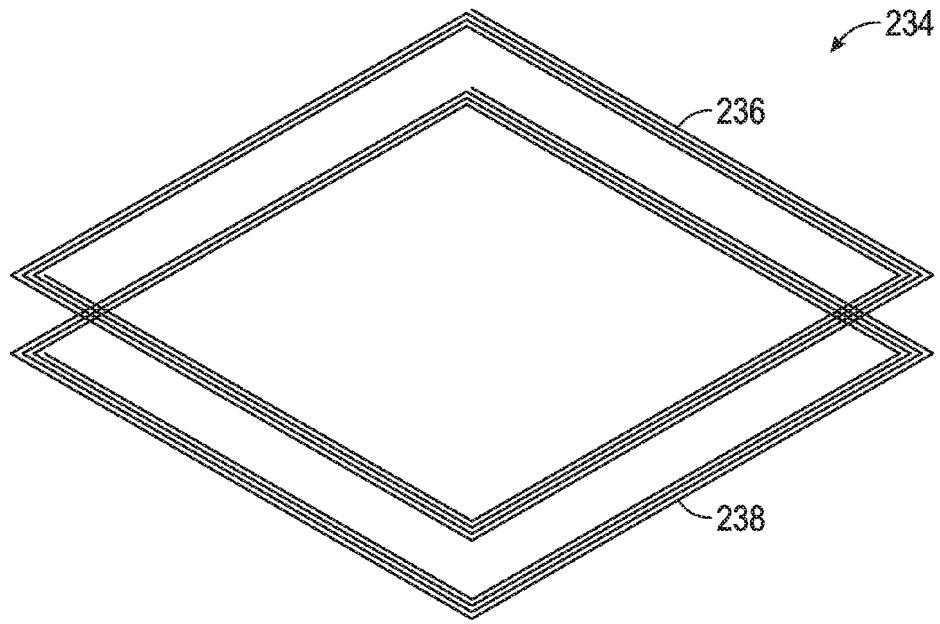
FIG. 10 is a top perspective view of a plurality of resonant coils used in a method of use of a tunable resonant inductive coil system.

FIG. 10 shows a representative example of two coils or antennas in close proximity with one another but not perfectly aligned (i.e., slightly offset), though nevertheless configured to resonate at the same frequency. The resonant coils 234 include a first coil 236 and a second coil 238. The two coils could be representative of different computing devices. For example, one coil could be implemented in a smart phone, as described above, and another could be implemented in a charging station, such as to charge the phone using WPT. One coil could be implemented in a smart phone and another could be implemented in a terminal or payment kiosk at a store, such as for payment via NFC. One coil could be in one mobile device and the other could be in another mobile device, to allow data transfer between mobile devices (such as between two mobile phones). The coils are not limited to mobile phones and may be implemented in tablets, laptops, desktop computers, and so forth—essentially in any computing device.

Figure 11:
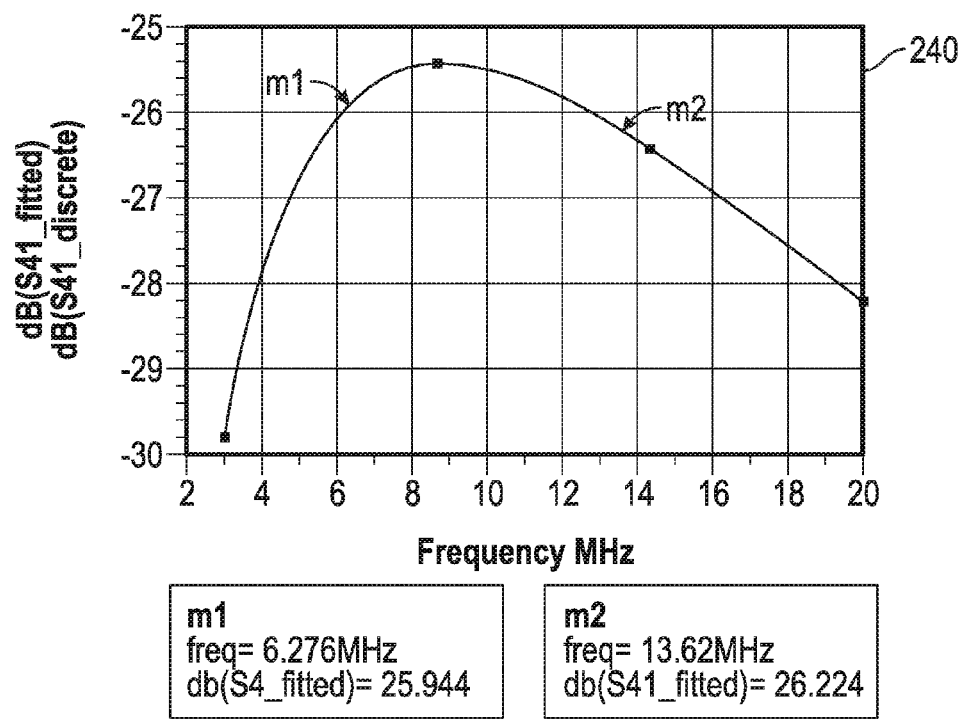
FIG. 11 is a graph plotting resonant coupling versus frequency for the plurality of resonant coils of FIG. 10 at a separation distance of 3.0 cm.

FIG. 11 shows a graph 240 which is representative of the resonant coupling of the two coils of FIG. 10. Two coils similar or identical to those shown in FIG. 10 were modeled using modeling software, with some offset from perfect alignment as described, and resonant coupling during magnetic resonance between antennas (in other words, the coupling coefficient $S_{21}$ in dB) was determined for various separation distances as a function of frequency. The modeling software used was a software marketed under the name Advanced Design Systems (ADS) by Keysight Technologies Inc. of Santa Rosa, Calif. FIG. 11 is a graph which shows the resonant coupling that was modeled when the antennas/coils were at a distance of 3.0 cm from one another. As can be seen the coupling was simulated between frequencies of 2 and 20 MHz. The two points m1 and m2 on the graph represent values that were chosen to be somewhat close to the target frequencies for WPT and NFC. They are not exactly similar to the target frequencies but are relatively close, with m1 being 6.276 MHz (instead of 6.25 MHz or 6.78 MHz) and m2 being 13.62 MHz (instead of 13.25 MHz or 13.56 MHz).

The square dots on the graph of FIG. 11 represent discrete modeled values for the resonant coupling and the curve represents a fitted curve using the discrete values. Table 1, below, shows the coupling coefficient $S_{21}$ in dB at the 6.276 MHz and 13.62 MHz values for separation distances of 0.5 cm, 1.0 cm, 1.5 cm, 2.0 cm, 2.5 cm, and 3.0 cm.

TABLE 1 coupling coefficient S21 for various separation distances

| Separation (cm) | $S_{21}$ at 6.276 MHz (dB) | $S_{21}$ at 13.62 MHz (dB) |
|---|---|---|
| 0.5 | −12.948 | −12.392 |
| 1.0 | −16.207 | −16.053 |

TABLE 1-continued coupling coefficient S21 for various separation distances

| Separation (cm) | S$_{21}$ at 6.276 MHz (dB) | S$_{21}$ at 13.62 MHz (dB) |
|---|---|---|
| 1.5 | −19.042 | −19.102 |
| 2.0 | −21.562 | −21.735 |
| 2.5 | −23.847 | −24.085 |
| 3.0 | −25.944 | −26.244 |

As has been described above, magnetic resonant coupling allows for transfer of energy/data over greater distances than traditional inductive coupling, and the modeled coupling coefficients of Table 1 reflect this, showing relatively significant coupling even at distances of 3.0 cm between the paired coils.

Figure 12:
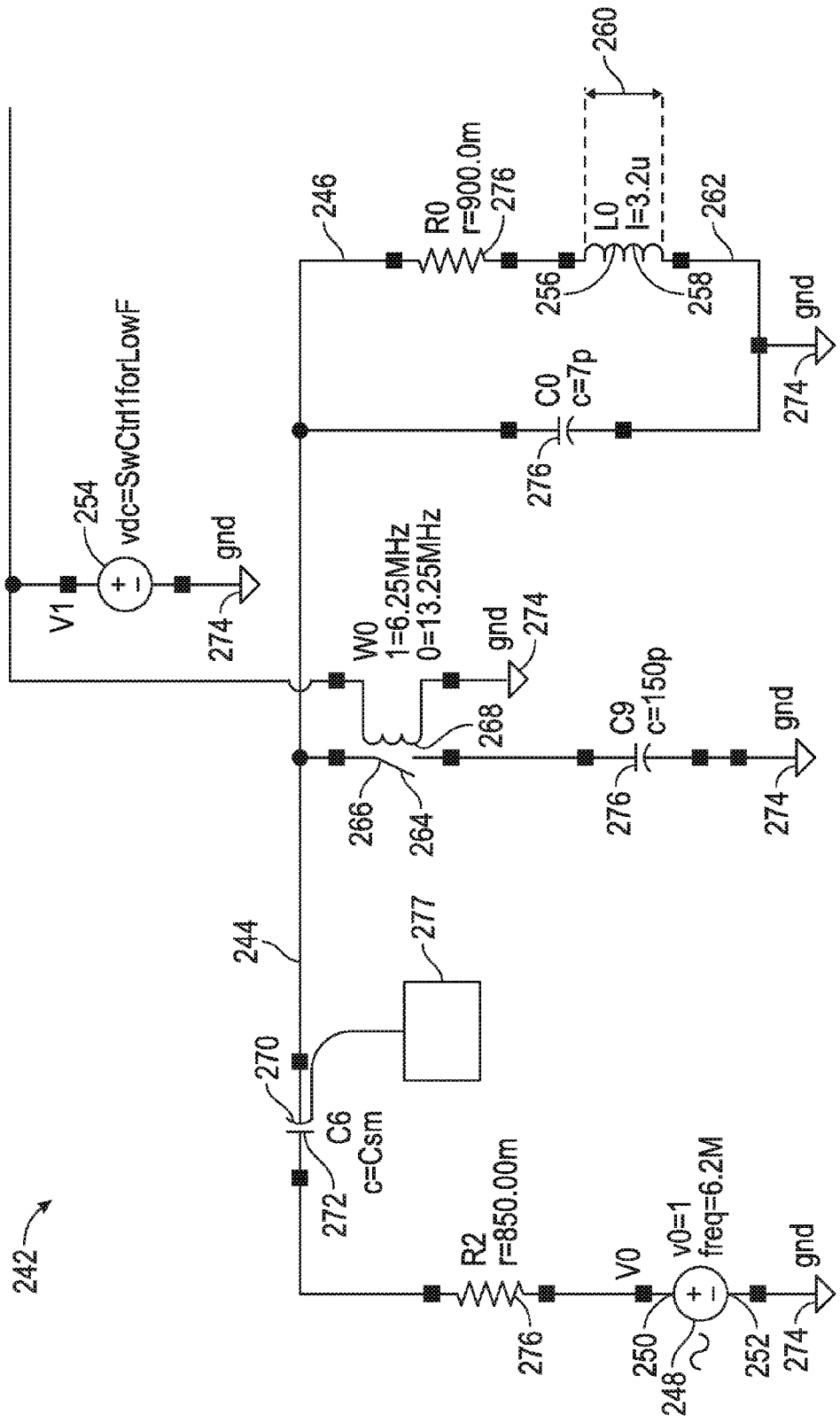
FIG. 12 is a diagram of an implementation of a tunable resonant inductive coil system.

FIG. 12 shows a tunable resonant inductive coil system (system) 242 which is based upon modeling one of the above modeled coils of FIGS. 10-11 as a load. System 242 includes an electrical circuit 244 which includes an LCR circuit (resonant circuit) (LC circuit) 246 (seen at the right side of the drawing and including L0, C0 and R0). An AC voltage source 248 has a first terminal 250 and a second terminal 252. The second terminal is coupled with a ground 274. A variable capacitor 270 (which is labeled C6 having a capacitance of c=Csm), which in the implementation shown is a BST variable capacitor 272 (but which in other implementations could include other types of capacitors described above), is coupled with the first terminal of the AC voltage source. An inductor 256, which includes a coil 258, is coupled in series with the variable capacitor, and an entire length 260 of the coil 258 is depicted. A return line 262 couples the coil with a ground 274.

A control element 277 is also included, which controls the variable capacitor. In implementations the BST variable capacitor may be a BST variable capacitor marketed under the name Passive Tunable Integrated Circuit (PTIC) by On Semiconductor of Phoenix, Ariz. For example, the BST variable capacitor could have a configuration similar to that shown in Appendix A ("TCP-4182UB—8.2 pF Passive Tunable Integrated Circuits (PTIC)"), the entire disclosure of which is incorporated herein by reference, except that while the BST variable capacitor of Appendix A is configured to have a tuning range from between 1 pF and 10 pF, the BST variable capacitor of FIG. 12 may be configured to have a 3:1 tuning ratio from 25 pF to 75 pF. The BST variable capacitor may be in a larger package than that shown in Appendix A, and could for example fit in an existing 12 pillar frame and have a bias RC of about 800 Hz. Other adjustments may include a different balance between bias resistor versus capacitor area to achieve an appropriate RC charging constant, differences in the design of vias to optimize power flows, and the like.

The control element 277 controls the BST variable capacitor to vary its capacitance. A representative example of a control element is given in Appendix B ("TCC-103—Three-Output PTIC Control IC"), which is entirely incorporated herein by reference. The TCC-103 control element described in Appendix B, however, has some additional functionality than what is needed for system 242, and so an alternative control element using a diode based voltage multiplier may be used instead, as will be described hereafter. The control element sends one or more control signals to the BST variable capacitor to vary the capacitance of the BST variable capacitor.

Referring still to FIG. 12, a switch 264 is coupled with the BST variable capacitor. The switch in the implementation shown is a magnetic switch (switch) 266 which is controlled by inductor (coil) 268. Switch 266 in implementations is RF power capable. A direct current (DC) voltage source 254 has a first terminal coupled with the coil 268 and a second terminal coupled with a ground 274. The DC voltage source varies an inductance of the coil 268 which in turn operates the switch. The coil 268 is coupled with a ground 274.

When the switch is open, a fixed capacitor C9 is electrically isolated from the BST variable capacitor and the resonant circuit, and when the switch is closed fixed capacitor C9 is electrically coupled with the BST variable capacitor and the resonant circuit so that the fixed capacitor C9 is in series with the BST variable capacitor and in parallel with the coil 258. The fixed capacitor is coupled with a ground 274.

A number of additional passive electrical components 276 are included in system 242 in addition to capacitor C9, including resistor R2 coupling the first terminal of the AC voltage source with the BST variable capacitor, capacitor C0 coupling the BST variable capacitor with a ground 274 (and part of the LCR circuit), and resistor R0 coupling the BST variable capacitor with the coil 258 (and also part of the LCR circuit). The value of each component in the circuit is given—for example resistor R2 is given a value of "850.00 m" by which is meant 850 milliohms. C9 has a value of 150 pF, C0 has a value of 7 pF, resistor R0 has a value of 900 milliohms, and coil 258 (L0) has a value of 3.2 microHenries. In other implementations the switch and fixed capacitor C9 may be excluded, and in other implementations one or more of the additional passive electrical components 276 may be excluded. In other implementations different or additional passive electrical components 276 may be added.

Referring still to FIG. 12, a voltage at the first terminal of the AC voltage source is represented by V0 and at the V0=1 setting is seen to have a frequency of 6.2 MHz (though this is short for 6.25 MHz) while at V0=0 it will have a frequency of 13.25 MHz. Switch W0 is seen to have an open setting 0 which corresponds with the 13.25 MHz frequency and a closed setting 1 which corresponds with the 6.25 MHz frequency. The DC voltage source has next to it the phrase "vdc=SwCtrllforLowF" indicating that the switch is switched to the closed position for the 6.25 MHz frequency (Low Frequency).

Other elements may be included which are not shown in the simplified diagram of FIG. 12 for ease of viewing the elements that are present. There may be, for instance, one or more controllers controlling the AC and DC voltage sources, and other passive components as has been described above. The operation of system 242 involves adjusting the electrical circuit between two configurations. In a first configuration the DC voltage source would be controlled (or turned off) so that the switch is closed. This corresponds with the 6.25 MHz frequency. The control element 277 will, correspondingly, adjust the capacitance of the BST variable capacitor. For the 6.25 MHz setting the capacitance of the BST variable capacitor, which has been described as ranging from 25-75 pF, is adjusted to 42.0 pF. The adjustment of the capacitance of the BST variable capacitor and the closing of the switch 264 "correspond" with one another in the sense that they are both done in order to achieve the adjusting of the resonant frequency of the resonant circuit 246 to 6.25 MHz, but neither adjustment is necessarily caused by (or is a direct result of) the other (though in other implementations such could be the case). Nevertheless, one or more electrical signals sent from a controller to control the DC voltage source to operate the switch and one or more control signals sent from the control element 277 may be synchronized in time to occur at the same, or about the same, time to achieve effective adjustment of the electrical circuit from one configuration to the other.

The above configuration, referred to as a "first configuration," wherein the resonant frequency of the resonant circuit 246 is adjusted to 6.25 MHz, is configured to be used for wireless power transfer (WPT). It is noted that the entire length 260 of antenna/coil 258 is used for the wireless power transfer.

To switch from the first configuration to a second configuration configured for near field communication (NFC), the DC voltage source is controlled to open the switch 264 and the control element 277 correspondingly sends one or more control signals to the BST variable capacitor to adjust the capacitance of the BST variable capacitor to 32.3 pF. The opening of the switch and control of the BST variable capacitor "correspond" in the same way as described earlier, and neither is necessarily controlled by or caused by the other (though in other implementations such could be the case).

In this second configuration the resonant frequency of the resonant circuit 246 switches to 13.25 MHz, which is a frequency configured for near field communication (NFC). It is noted that the entire length 260 of the antenna/coil 258 is used for the near field communication. Accordingly, in both wireless power transfer and in near field communication (or in other words at both the 6.25 MHz and at the 13.25 MHz frequencies) the entire length of the coil 258 is used. Similarly, if any of the other system configurations described previously are used for a tunable resonant inductive coil system the entire length of the coil of the respective resonant circuit may be used for both wireless power transfer and near field communication.

Using the system 242, a computing device may, using a single antenna or coil, (1) charge another device or receive a charge from another device using a WPT frequency of 6.25 MHz, and (2) communicate with another device (or the same device) using a near field communication (NFC) frequency of 13.25 MHz, by switching the resonant frequency of the resonant circuit of which the coil is a part. The inclusion of the BST variable capacitor in a matching filter allows the resonant frequency of the resonant circuit to be reconfigured for two different standards.

Although frequencies of 6.25 MHz for WPT and 13.25 MHz for NFC are described above, the practitioner of ordinary skill in the art will understand the variations that may be made for components of the system 242 in order to configure the system so that the lower frequency is 6.78 MHz to match the A4WP standard referenced above and a higher frequency of 13.56 MHz to match the common NFC frequency. The reader will notice that the lower frequency is half the higher frequency, so that an alternate embodiment could utilize one half of the coil 258 for one resonant frequency and the full coil 258 for another frequency, but one advantage of using the full coil as described above for both frequencies is that the signal strength is not reduced by using less of the coil. Another alternative is to use two antennas or coils but some advantages of using a single coil for both frequencies are: (1) it allows for one larger antenna instead of two smaller antennas which results in a greater signal strength for both signals; (2) it allows for more efficient use of space in/on a computing device, where sometimes it is prohibitive or less desirable to have to use space for two antennas instead of one antenna, and; (3) it allows for lower production cost due to only needing to have one antenna.

Not shown in FIG. 12, but included, may be a near field communication (NFC) chip. The NFC chip may control one or more aspects of the near field communications transmitted from a computing device and/or received by a computing device. The NFC chip could be damaged by wireless power transfer signals but, in implementations, the NFC chip is protected from WPT signals because adjusting the resonant frequency of the resonant circuit to the NFC frequency significantly detunes the resonant circuit from any nearby wireless charging source so that power is not received (or very little is received) at the NFC frequency. This effective rejection by the system/filter of WPT signals at NFC frequencies may allow for the dual use of WPT and NFC frequencies with a single antenna. The NFC chip and/or the electrical circuit may further have a notch filter for protection. In implementations the NFC chip is not activated until the electrical circuit is at the NFC resonant frequency—in other words the NFC chip may not search for NFC frequencies being transmitted to it until the system is set to the NFC configuration.

Figure 13:
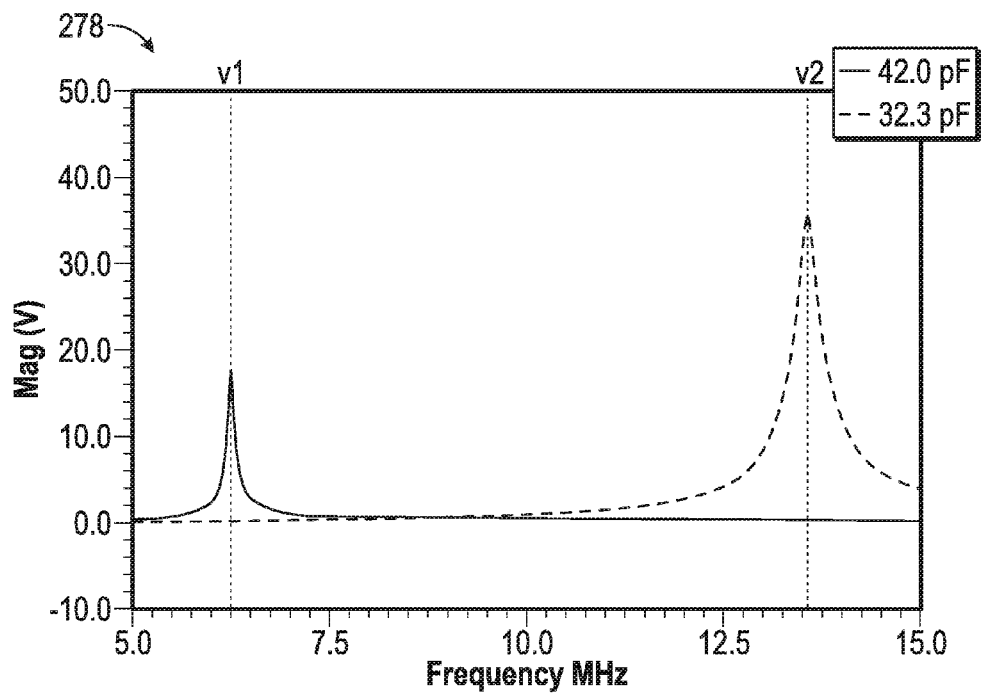
FIG. 13 is a graph plotting voltage versus frequency for the tunable resonant inductive coil system (system) of FIG. 12 when a resonant circuit of the system is adjusted to a resonant frequency of 6.250 MHz and when the resonant circuit is adjusted to a resonant frequency of 13.560 MHz.

FIG. 13 shows a graph 278 which represents an optimizing of the BST variable capacitor at two different frequencies for the NFC and WPT functionalities. The specific frequencies chosen in the representative example are 6.25 MHz and 13.56 MHz, though as indicated above the frequencies may be chosen as desired by a user, and for example may be set instead to 6.78 MHz and 13.56 MHz. Using the representative examples of FIG. 13, the capacitance of the variable capacitor may be chosen so that the peak current is achieved at the desired frequencies, and using the model the capacitances of 42.0 pF and 32.3 pF were found to achieve peak currents at the frequencies of 6.25 MHz and 13.56 MHz.

The capacitances of 42.0 pF and 32.3 pF are used when the system is exactly at 6.25 MHz and 13.56 MHz, respectively, but as described above the resonant frequency of the resonant circuit may be affected by many variables, such as heat, nearby magnetic devices or components, and the like. Accordingly, the target values of 6.25 MHz and 13.56 MHz may not achieve the optimum transfer efficiency between the transferring and receiving coil given different environmental conditions. Once the system 242 is in either the first or second configuration, however, the capacitance of the variable capacitor can then be adjusted all the way down to 25 pF or all the way up to 75 pF to fine tune the frequency and again achieve optimum resonant coupling. Thus, if the coil of the transmitter or receiver coil moves away from resonance (effective inductance L increases or decreases) the capacitance may be varied (decreased or increased, respectively) to bring the coil back into resonance.

Figure 14:
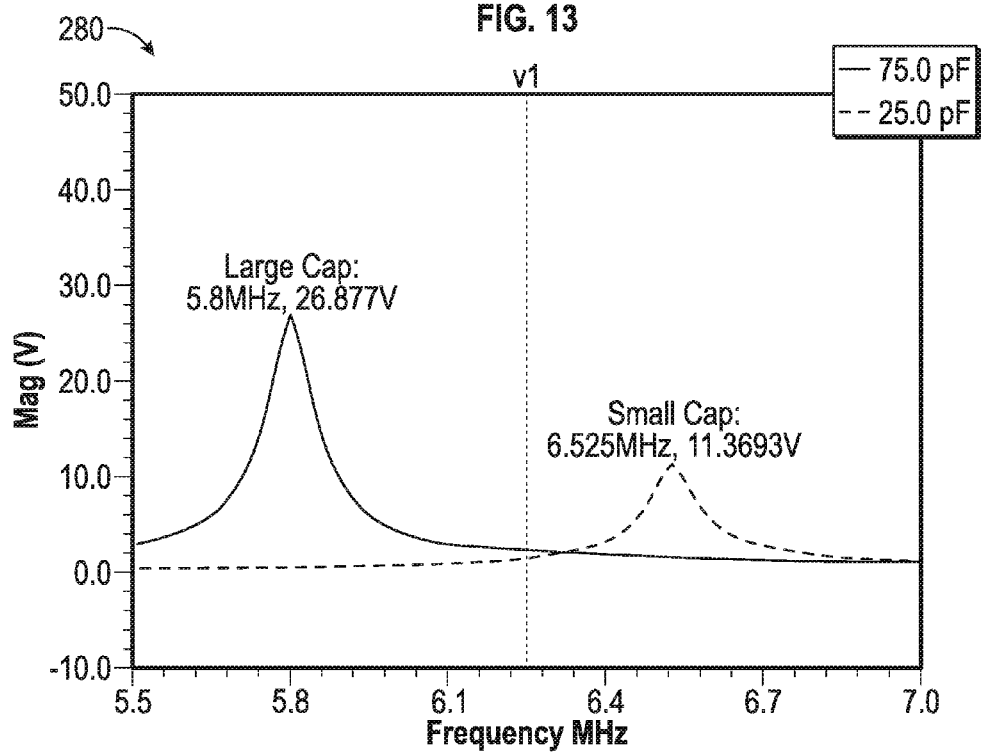
FIG. 14 is a graph plotting voltage versus frequency for the tunable resonant inductive coil system (system) of FIG. 12 when the system is in a configuration for wireless power transfer (WPT) and showing a resonant frequency range from a minimum resonant frequency (5.800 MHz) to a maximum resonant frequency (6.525 MHz) by varying a capacitance of a variable capacitor of the system.

As can be seen in FIG. 14, graph 280 shows that while the capacitance of 42.0 pF achieves the frequency of 6.25 MHz (corresponding with the V1 voltage), once the system is in that configuration with the switch closed, the variable capacitor may be further adjusted all the way down to 25.0 pF to increase the resonant frequency to 6.525 MHz (corresponding with a voltage magnitude of 11.3693 V). The variable capacitor may also be adjusted all the way up to 75.0 pF to decrease the resonant frequency to 5.8 MHz (corresponding with a voltage magnitude of 26.877 V). The variable capacitor may also be adjusted to any value in between to achieve any resonant frequency between 5.8 MHz and 6.525 MHz. In other implementations the variable capacitor and/or the system may be altered (such as by using the system 242 with a variable capacitor having a maximum capacitance above 75.0 pF) in order to achieve a range of 5.8 MHz to 7.525 MHz or some other range including the A4WP standard of 6.78 MHz).

Figure 15:
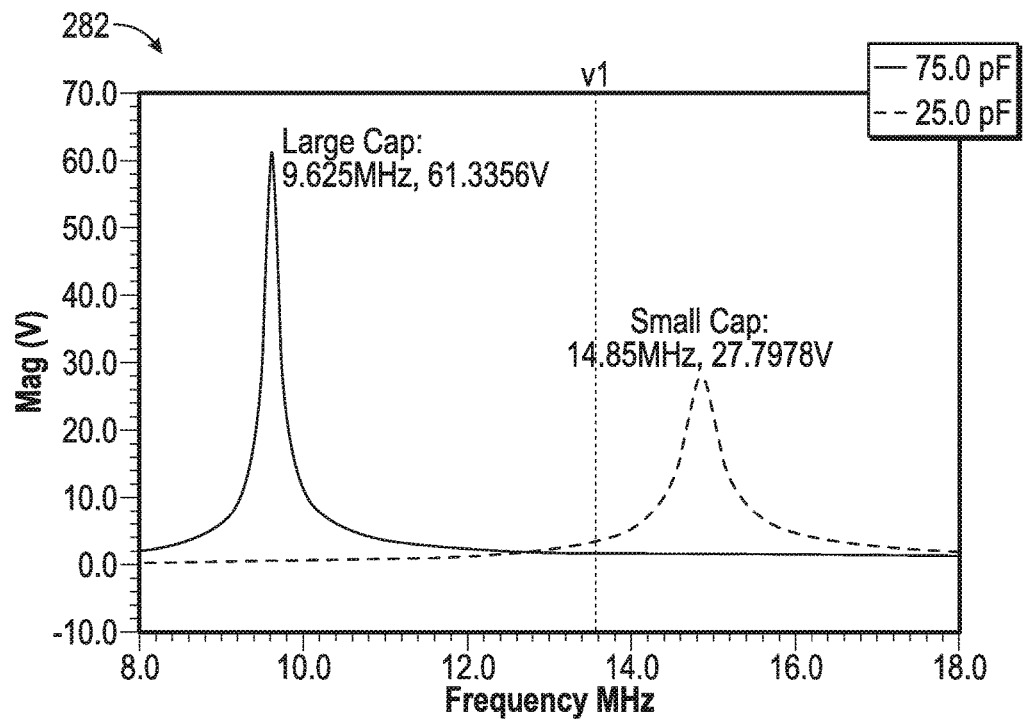
FIG. 15 is a graph plotting voltage versus frequency for the tunable resonant inductive coil system (system) of FIG. 12 when the system is in a configuration for near field communication (NFC) and showing a resonant frequency range from a minimum resonant frequency (9.625 MHz) to a maximum resonant frequency (14.850 MHz) by varying a capacitance of a variable capacitor of the system.

FIG. 15 shows graph 282 which shows that while the capacitance of 32.3 pF may achieve the frequency of 13.25 MHz (or 13.56 MHz) (corresponding with the V1 voltage), once the system is in that configuration with the switch open, the variable capacitor may be further adjusted all the way down to 25.0 pF to increase the resonant frequency to 14.85 MHz (corresponding with a voltage magnitude of 27.7978 V). The variable capacitor may also be adjusted all the way up to 75.0 pF to decrease the resonant frequency to 9.625 MHz (corresponding with a voltage magnitude of 61.3356 V). The variable capacitor may also be adjusted to any value in between to achieve any resonant frequency between 9.625 MHz and 14.85 MHz.

Naturally, the above representative examples are only illustrative of the various frequency shifts that can be accomplished to achieve both NFC and WPT frequencies and to fine tune around those frequencies to adjust for environmental changes and the like that may affect resonant frequencies. Thus, a system such as system 242 may be configured to operate at a first frequency of 6.78 MHz for WPT and at a second frequency of 13.56 for NFC, and to be further adjustable using a variable capacitor, such as a BST variable capacitor as described herein, to fine tune around either of those frequencies when the transmission and/or receiving antenna(s) becomes out of tune with the target frequency.

The system 242 and any similar system(s) described herein may be implemented at either antenna, transmission or receiving, or both, and may include feedback so that one system adjusts the resonant frequency of its resonant circuit in order to match the other system's resonant frequency, or vice versa, or both systems may be adjustable to match the other.

As has been described above, the TCC-103 controller is a representative example of a controller that could be used as the control element 277, but may not be needed. System 242 and similar systems may have very relaxed timing constraints compared to what the TCC-103 controller is capable of offering, and it may be desirable to have a different interface (perhaps a more complex interface) than the TCC-103 interface. A voltage booster instead may be implemented with an eight diode/capacitor multiplier using eight 1 nF 10 V capacitors and four dual hot carrier diodes such as those shown in Appendix C "MMBD452LT1G—Dual Hot-Carrier Diodes"), the disclosure of which is incorporated entirely herein by reference.

Figure 17:
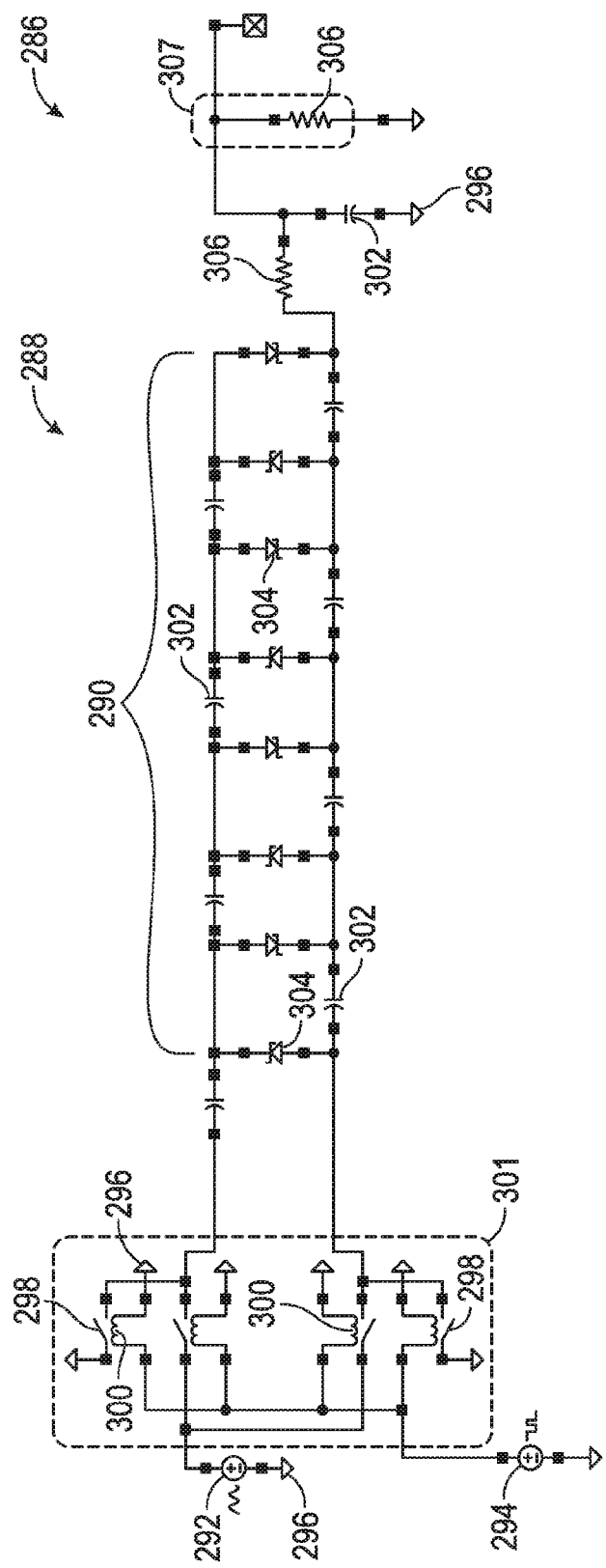
FIG. 17 is an implementation of a voltage booster used with implementations of tunable resonant inductive coil systems.

FIG. 17 shows a circuit diagram 286 of a voltage booster 288 which may be used as a control element 277. The voltage booster includes a Cockcroft Walton multiplier 290. A first voltage source 292 (represented as a sine wave input) is coupled with ground 296 and is a first input for a double pole double throw (DPDT) analog switch (switch) 301. A second voltage source 294 (represented as a step wave input) is coupled with ground and is a second input for switch 301. Switch 301 further includes a number of switches 298 and inductors 300, not all of which are numbered in FIG. 17 but all of which are enclosed within the dotted outline of switch 301.

The Cockcroft Walton multiplier 290 is executed using a number of capacitors 302 and diodes 304. Diode pairs may be implemented using dual hot carrier diodes as described above in Appendix C, so that the leftmost diode 304 in FIG. 17 and the next closest diode are included in a single dual hot carrier diode, and each next pair is likewise included in a single dual hot carrier diode, thus the eight Schottky barrier diodes are implemented using four dual hot carrier diodes. A number of resistors 306 are also included, and the rightmost resistor 306 is for biasing of the variable capacitor.

In this way the DPDT analog switch may be used to chop a programmable/variable DC input available from the variable capacitor (such as a PMIC as described above) which may range from 0 V to 3.6 V, for example. In the representative example shown in FIG. 17 the DPDT analog switch may have a frequency between 100-200 kHz, the capacitors forming the Cockroft Walton multiplier may be 10V 1 nF capacitors, the rightmost resistor (leakage resistor) 307 may have a resistance of 1 Megaohm, the next resistor to the left may have a resistance of 1 Kiloohm, and the capacitor between that resistor and ground 296 may have a capacitance of 10 nF. Other configurations are possible, and this is only one representative example.

As seen above, a system 242 or similar system may be implemented using a PTIC variable capacitor, a voltage booster, and other elements shown in FIG. 12 for a matching filter. Additional components may be utilized as will be understood by the practitioner of ordinary skill in the art to modify the system.

Figure 16:
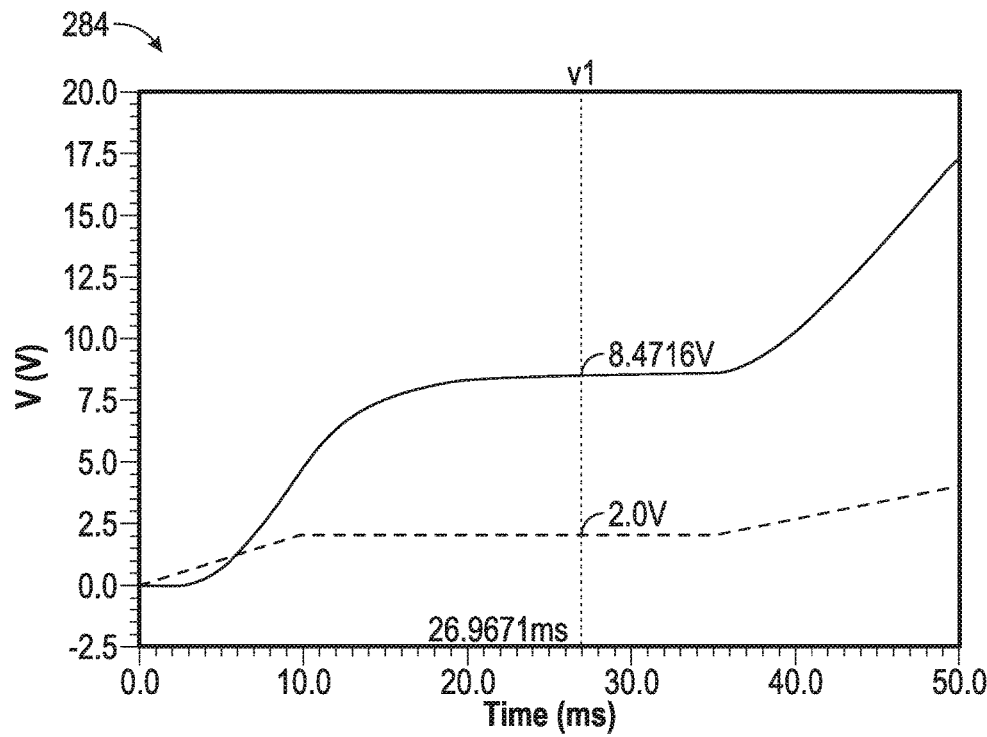
FIG. 16 is a graph plotting voltage versus time for a tunable resonant inductive coil system of FIG. 12 using a voltage booster.

FIG. 16 is a graph 284 plotting voltage versus time of the voltage booster 288 showing the input voltage (dotted line) and output voltage (solid line), revealing how increases in input voltage (such as from 0 to 10 milliseconds and from 35 to 50 milliseconds) correspond with sharp rises in the output voltage. The rising and stabilization of the output voltage is seen to lag the rising and stabilization of the input voltage by about 3-4 ms. At a time of 26.9671 ms the input voltage is 2.0 V and the output voltage is 8.4716 V, showing more than a quadrupling of the voltage.

In implementations a control element 277 may include the above described voltage booster which may operate on less current than a TCC-103 controller. The voltage booster (or boost converter) may be coupled with a GND pin (ground pin), a VBAT pin (coupled with a battery or power supply), and a VHV pin (high voltage pin). Control logic of the control element may include a Vout+ and Vout− elements and a StartPositionHorL (for starting position high or low) logic element(s) or a mobile industry processor interface (MIPI) clock data plus a triggering element or logic. The control element may include a clock generator to generate waves for boost and control timing. The control element may also include a one-time programmable (OTP) element for trim, or in other words to set the initial target values for the variable capacitor for the target WPT frequency and the target NFC frequency within the overall frequency range of the variable capacitor. An output pin OUT may be included. The control element, when implemented using the described voltage booster, may include less inputs than a TCC-103 controller and may be slower. A digital power VIO pin and additional ground GND pin may also be included. In total the control element 277 may have 9 pins including 2 grounds in a 3×3 array of 0.4 mm redistribution layer (RDL) bumps.

A control element as described above may be implemented using a die size of 1.28 mm by 1.28 mm (including a 1.2 mm by 1.2 mm die plus 80 μm scribes. The control signal(s) from the control element to the variable capacitor in implementations includes one or more DC control voltages. The above example using a voltage booster is only one of many examples of what could be used to control the variable capacitor.

The coils/antennas described herein may be implemented using a variety of elements. In implementations the coils/ antennas may be formed of a conductive metal such as copper, gold, silver, any alloy of the same, and the like. Referring to FIG. 10 a representative coil formed of copper could be formed using (or using about) 1 ounce of copper with a track width (W) of 400 microns, a track separation (d) of 200 microns, a track thickness (t) of 35 microns (or 34.79 microns), an antenna outside X dimension (AntL) of 50 mm, an antenna outside Y dimension (AntW) of 50 mm, and a total of 3.75 complete turns with 15 total sides. The coil may have a total inductance of 3.27 microHenries and a total resistance of 0.87 ohms at 20 degrees Celsius. Different specifications may be used if the material is gold, silver, an alloy, or some other element, to achieve the desired inductance, resistivity, and other characteristics. The coil(s) of any of the systems described herein may be designed taking self and mutual inductive effects (effects between paired coils from different computing/charging devices) and other factors into consideration. The above design parameters are based on a copper resistivity of $1.68 \times 10^{-8}$ ohm meters and a conductivity of $8.96 \times 10^7$ S/m.

The above described systems thus include an antenna, the ability to shift between one high frequency and one low frequency for NFC and WPT, fine tuning capability with continuous tuning control for fine tuning when coils are not optimally resonant with one another at the target NFC and WPT frequencies, and may include AC/DC power conversion plus protection of an NFC chip, as described above. Protection of the antenna, to shield it from undesirable interference from some elements of the computing device itself or from other devices, may also be included in some implementations. The fine tuning of the frequency at WPT levels allows optimization of the power transfer efficiency to desirable levels. When the system is configured for WPT it forms a matching coil wireless charging interface circuit.

The above elements thus allow the design of tunable radio frequency (RF) devices, such as antennas in cell phones, tablets, laptops, terminals, kiosks, payment devices, and other computing devices, for the use of near field communication (NFC) and wireless power transfer (WPT). The NFC capability may allow, by non-limiting example, data exchange, payment capabilities, and other services/capabilities that may be used at short range (such as around 3.0 cm or closer).

While system 242 shows a more specific implementation of a tunable resonant inductive coil system, such a layout may be modified to use any of the configurations shown in FIGS. 3-8 for different implementations of tunable resonant inductive coil systems. Any of the tunable resonant inductive coil systems described herein may be used for either a transmission coil, a receiving coil, or both.

In any of the tunable resonant inductive coil systems described herein the coil could be replaced by a non-coil B-field generator. As indicated above, non-BST capacitors may be used for the variable capacitor(s) in implementations, and may include any capacitor that varies capacitance based on receipt of one or more electrical control signals. Any of the BST variable capacitors described herein may include doped BST dielectrics.

The use of BST variable capacitors may have the following advantages: (1) continuously variable capacitance; (2) stable feedback (i.e., when adjustment is needed to correct dissonance detected between primary and secondary coils); (3) good linearity performance (generally linear behavior of reactance vs. frequency for resonant circuit above the resonant frequency); (4) high Q values; (5) small size; (6) manufacturable using inexpensive, repeatable, and scalable semiconductor processes; (7) good tuning range; (8) good tuning speed (capacitance variation rate); (9) electric control (Vbias adjustment which may be generated from many sources); (10) excellent matching due to repeatable semiconductor processes (including simultaneous fabrication of dual structures); (11) low cost; (12) good range of capacitor sizes suitable for multiple coil configurations, and; (13) common assembly methods such as wafer level chip scale packaging (WLCSP) soldering flows.

While common WPT frequencies are discussed above, such as 6.78 MHz of the A4WP standard which is common in the mobile communications industry, the above elements and methods may also be used to create custom systems using different frequencies such as in the medical, automotive, and other industrial and consumer industries. The matching of resonant frequencies for RF power transfer systems may reduce reflective power loss at antenna interfaces.

Any of the tunable resonant inductive coil systems disclosed herein may include additional passive electrical components. Any of the fixed capacitors described herein may include any type of fixed capacitor. The specific circuit diagrams given herein are only representative examples and various other configurations are possible for other implementations of tunable resonant inductive coil systems.

Methods of use of any of the tunable resonant inductive coil systems described herein may include providing any of the electrical circuits described herein and, in response to the electrical circuit receiving a control signal (such as from control element 277 or the like) at the variable capacitor, adjusting a capacitance of the variable capacitor to adjust a resonant frequency of a resonant circuit of the electrical circuit between a first resonant frequency configured for wireless power transfer (WPT) (which may or may not be 6.78 MHz or 6.25 MHz) and a second resonant frequency used for near field communication (NFC) (which may or may not be 13.25 MHz or 13.56 MHz). The methods, as indicated above, may include not using only part of the coil/antenna for each frequency, but using an entire length of the coil, or in other words the entire coil, for both the NFC frequency and the WPT frequency. The method of switching between NFC and WPT target frequencies may include opening/closing a switch of the electrical circuit, as described above with reference to FIG. 12, which may electrically couple a fixed capacitor in parallel with the coil. The method may include tuning the capacitance of the variable capacitor to adjust the resonant frequency (either or both of the first and/or second resonant frequency) in response to the resonant circuit being out of resonance with a second resonant circuit (having a paired secondary coil) of a computing device. The method may include tuning the NFC resonant frequency within a range of 5.8 MHz and 6.525 MHz (though other implementations may include tuning within a range that includes the A4WP standard of 6.78 MHz, such as a range from 5.800 MHz to 7.525 MHz, such as by using a variable capacitor with maximum capacitance above 75.0 pF) and tuning the WPT resonant frequency within a range of 9.625 MHz and 14.850 MHz. The method may include protecting an NFC chip, described above, from damage from a power source by detuning the resonant circuit from the power source signal at NFC frequencies.

In places where the description above refers to particular implementations of tunable resonant inductive coil systems for wireless power transfer and near field communication and related methods and implementing components, sub-components, methods and sub-methods, it should be readily apparent that a number of modifications may be made without departing from the spirit thereof and that these implementations, implementing components, sub-components, methods and sub-methods may be applied to other tunable resonant inductive coil systems for wireless power transfer and near field communication and related methods.

What is claimed is:

1. A tunable resonant inductive coil system, comprising:
an electrical circuit comprising an alternating current (AC) voltage source, a single barium strontium titanate (BST) tunable capacitor coupled in series with a first terminal of the AC voltage source, a coil coupled in series with the single BST tunable capacitor, and a return line coupling the coil with one of a second terminal of the AC voltage source and a ground;
wherein the electrical circuit forms an LC circuit (resonant circuit);
wherein the electrical circuit is configured to, in response to receiving one or more electrical signals, adjust between a first configuration and a second configuration, wherein in the first configuration the resonant circuit has a first resonant frequency configured to be used for wireless power transfer and in the second configuration the resonant circuit has a second resonant frequency configured to be used for near field communication (NFC), wherein an entire length of the coil is used for both the first resonant frequency and the second resonant frequency, and;
wherein adjusting the electrical circuit between the first configuration and the second configuration comprises varying a capacitance of the single BST tunable capacitor in response to receiving a control signal at the single BST tunable capacitor.

2. The system of claim 1, wherein the coil comprises an antenna.

3. The system of claim 1, wherein adjusting the electrical circuit between the first configuration and the second configuration further comprises one of opening and closing a switch of the electrical circuit to one of electrically couple a fixed capacitor with the resonant circuit and electrically isolate the fixed capacitor from the resonant circuit.

4. The system of claim 1, further comprising a fixed capacitor coupled in series between the first terminal of the AC voltage source and the coil.

5. The system of claim 1, further comprising a fixed capacitor coupled in series between the coil and one of the second terminal of the AC voltage source and the ground.

6. The system of claim 1, further comprising a fixed capacitor coupled in parallel with the single BST tunable capacitor and in series between the first terminal of the AC voltage source and the coil.

7. The system of claim 1, wherein the first resonant frequency is between 5.800 MHz and 7.525 MHz and wherein the second resonant frequency is between 9.625 MHz and 14.850 MHz.

8. A tunable resonant inductive coil system, consisting of:
an electrical circuit consisting of an alternating current (AC) voltage source;
a single barium strontium titanate (BST) tunable capacitor, the single BST tunable capacitors coupled in series with a first terminal of the AC voltage source;
a control element configured to control the capacitance of the single BST tunable capacitor;
a coil coupled in series with the first terminal of the AC voltage source;
a return line coupling the coil with one of a second terminal of the AC voltage source and a ground;
a switch coupled with the AC voltage source;
a direct current (DC) voltage source controlling the switch, and;
one or more additional passive electrical components;
wherein the electrical circuit forms an LC circuit (resonant circuit);
wherein the electrical circuit is configured to, in response to receiving one or more electrical signals, adjust between a first configuration and a second configuration by one of opening and closing the switch and by correspondingly varying a capacitance of the single BST tunable capacitor, wherein in the first configuration the resonant circuit has a first resonant frequency configured to be used for wireless power transfer and in the second configuration the resonant circuit has a second resonant frequency configured to be used for near field communication (NFC), and;
wherein an entire length of the coil is used for both the first resonant frequency and the second resonant frequency.

9. A method of use of a tunable resonant inductive coil system, comprising:
providing an electrical circuit, the electrical circuit comprising an alternating current (AC) voltage source having a first terminal, a single barium strontium titanate (BST) tunable capacitor electrically coupled in series with the first terminal of the AC voltage source, a coil electrically coupled in series with the single BST tunable capacitor, and a return line electrically coupling the coil with one of a second terminal of the AC voltage source and a ground;
in response to the electrical circuit receiving a control signal at the single BST tunable capacitor, adjusting a capacitance of the single BST tunable capacitor to adjust a resonant frequency between a first resonant frequency configured to be used for wireless power transfer and a second resonant frequency configured to be used for near field communication (NFC), and;
using an entire length of the coil for both the first resonant frequency and the second resonant frequency.

10. The method of claim 9, wherein adjusting the resonant frequency between the first resonant frequency and the second resonant frequency comprises one of adjusting the resonant frequency from a lower value to a higher value and adjusting the resonant frequency from the higher value to the lower value, wherein the lower value is between 5.800 MHz and 7.525 MHz and wherein the higher value is between 9.625 MHz and 14.850 MHz.

11. The method of claim 9, wherein the coil comprises an antenna.

12. The method of claim 9, wherein the single BST tunable capacitor does not comprise a switched capacitor, does not comprise a varactor diode, and does not comprise a trimmer capacitor.

13. The method of claim 9, wherein adjusting the resonant frequency between the first resonant frequency and the second resonant frequency comprises one of opening and closing a switch of the electrical circuit.

14. The method of claim 13, wherein one of opening and closing the switch electrically couples a fixed capacitor in parallel with the coil.

15. The method of claim 9, further comprising tuning the capacitance of the single BST tunable capacitor to adjust one of the first resonant frequency and the second resonant frequency in response to the resonant circuit being out of resonance with a second resonant circuit of a computing device.

16. The method of claim 15, wherein tuning the capacitance of the single BST tunable capacitor comprises one of adjusting the first resonant frequency from a first value to a second value and adjusting the second resonant frequency from a third value to a fourth value, wherein the first value and the second value are between 5.800 MHz and 7.525 MHz and wherein the third value and the fourth value are between 9.625 MHz and 14.850 MHz.

\* \* \* \* \*